United States Patent
Christiansen et al.

(10) Patent No.: US 11,006,637 B2
(45) Date of Patent: May 18, 2021

(54) PROCESSES FOR MAKING STEEPED WHOLE GRAINS AND PRODUCTS COMPRISING STEEPED WHOLE GRAINS

(71) Applicant: CARGILL, INCORPORATED, Wayzata, MN (US)

(72) Inventors: Katrina Christiansen, Jamestown, ND (US); Xiang S. Yin, Medina, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 15/018,299

(22) PCT Filed: Aug. 5, 2014

(86) PCT No.: PCT/US2014/049739
§ 371 (c)(1),
(2) Date: Feb. 8, 2016

(87) PCT Pub. No.: WO2015/021025
PCT Pub. Date: Feb. 12, 2015

(65) Prior Publication Data
US 2016/0205951 A1 Jul. 21, 2016

Related U.S. Application Data

(60) Provisional application No. 61/863,369, filed on Aug. 7, 2013.

(51) Int. Cl.
| | | |
|---|---|---|
| A21D 2/38 | (2006.01) | |
| C12C 1/02 | (2006.01) | |
| C12C 1/027 | (2006.01) | |
| C12C 1/067 | (2006.01) | |
| A21D 13/02 | (2006.01) | |
| A21D 13/062 | (2017.01) | |

(52) U.S. Cl.
CPC ............... *A21D 2/38* (2013.01); *A21D 13/02* (2013.01); *A21D 13/062* (2013.01); *C12C 1/02* (2013.01); *C12C 1/027* (2013.01); *C12C 1/067* (2013.01)

(58) Field of Classification Search
CPC .. A21D 2/38; A21D 13/02; C12C 1/02; C12C 1/027
USPC .......................................................... 326/28
See application file for complete search history.

(56) References Cited

U.S. PATENT DOCUMENTS

| | | | | |
|---|---|---|---|---|
| 2,206,619 | A | * | 7/1940 | Schreier ..................... A23L 7/20 426/18 |
| 2,691,592 | A | * | 10/1954 | Hansen ..................... A23L 7/20 426/28 |
| 2,960,409 | A | | 11/1960 | Macey et al. |
| 2,991,231 | A | | 4/1961 | Lucht et al. |
| 3,014,847 | A | | 12/1961 | Kneen et al. |
| 3,030,279 | A | | 4/1962 | De Ryhove et al. |
| 3,116,221 | A | | 12/1963 | Sfat et al. |
| 3,141,833 | A | | 7/1964 | Bank |
| 3,149,053 | A | | 9/1964 | Kneen et al. |
| 3,158,551 | A | | 11/1964 | Macey et al. |
| 3,188,279 | A | | 6/1965 | Kneen et al. |
| 3,383,290 | A | | 5/1968 | Henri |
| 3,556,946 | A | | 1/1971 | Polen |
| 4,004,034 | A | * | 1/1977 | Delhaye ..................... C12C 1/02 426/29 |
| 4,052,795 | A | | 10/1977 | Pollock et al. |
| 4,251,630 | A | | 2/1981 | Pratt et al. |
| 4,277,505 | A | | 7/1981 | Simpson |
| 4,613,507 | A | | 9/1986 | Fulger et al. |
| 5,405,624 | A | | 4/1995 | Doncheck et al. |
| 5,833,977 | A | | 11/1998 | Relander |
| 5,862,627 | A | | 1/1999 | Jang |
| 6,613,371 | B2 | | 9/2003 | Delrue et al. |

(Continued)

FOREIGN PATENT DOCUMENTS

| | | |
|---|---|---|
| DE | 1229482 | 12/1966 |
| DE | 3028361 A1 | 3/1982 |

(Continued)

OTHER PUBLICATIONS

Malleshi et al., "Development of weaning food formulations based on malting and roller drying of sorghum and cowpea", International Journal of Food Science & Technology, International Journal of Food Science & Technology, vol. 24, Issue 5, pp. 511-519, Oct. 1989, Article first published online: Jun. 28, 2007: available at: http://onlinelibrary.wiley.com/doi/10.1111/j.1365-2621.1989.tb00674.x/abstract; accessed on Jan. 5, 2015.

Traore et al., "Changes in nutrient composition, phytate and cyanide contents and α-amylase activity during cereal malting in small production units in Ouagadougou (Burkina Faso)", Food Chemistry. 88, 105-114 (2004).

PCT International Search Report, PCT/US2014/049379, dated Jan. 12, 2015, 1 page.

Brookes et al. In J. Inst. Brew. 82: pp. 14-26, 1976.

(Continued)

*Primary Examiner* — Hamid R Badr (57) ABSTRACT

Disclosed herein is a process for producing a steeped grain comprising steeping at least one grain at a temperature from about 2° C. to about 29° C. for a period of time less than about 24 hours to a moisture content ranging from about 29% to about 38%; optionally, germinating the at least one grain for less than about 2 days; and kilning with controlled air circulation the at least one grain at a temperature ranging from at least about 49° C. to about 93° C. for less than about 20 hours to a moisture content of about 7% to about 16%. Also disclosed herein is a sprouted grain prepared from the processes disclosed herein. Further disclosed herein are a dough comprising steeped whole grains prepared from the processes disclosed herein, as well as baked goods and beverages comprising steeped whole grains prepared from the processed disclosed herein.

16 Claims, 1 Drawing Sheet

(56) References Cited

U.S. PATENT DOCUMENTS

| | | | |
|---|---|---|---|
| 7,241,462 | B2 | 7/2007 | Coppens et al. |
| 2001/0043966 | A1 | 11/2001 | Delrue et al. |
| 2003/0148012 | A1* | 8/2003 | Scott .................. C12C 1/047 426/618 |
| 2005/0150161 | A1 | 7/2005 | Hartle et al. |
| 2006/0121157 | A1* | 6/2006 | Caspers .................. A21D 2/38 426/11 |
| 2006/0292263 | A1* | 12/2006 | Arnaut .................. A21D 8/042 426/20 |
| 2008/0251067 | A1 | 10/2008 | Kirkpatrick et al. |
| 2011/0117259 | A1 | 5/2011 | Storek et al. |
| 2012/0263824 | A1 | 10/2012 | Finney |
| 2013/0095207 | A1 | 4/2013 | Knudsen et al. |

FOREIGN PATENT DOCUMENTS

| | | | |
|---|---|---|---|
| DE | 102011119956 | A1 | 6/2013 |
| EP | 0030575 | A1 | 6/1981 |
| EP | 1988150 | | 11/2008 |
| GB | 1007286 | | 10/1965 |
| GB | 1012213 | A | 12/1965 |
| GB | 1057987 | A | 2/1967 |
| GB | 1305370 | | 1/1973 |
| GB | 1316226 | | 5/1973 |
| GB | 2009231 | | 6/1979 |
| GB | 2112017 | | 7/1983 |
| JP | 57-122786 | | 7/1982 |
| JP | 57-186485 | A | 11/1982 |
| WO | WO1994/16053 | | 7/1994 |
| WO | 9803627 | A1 | 1/1998 |
| WO | 2007030872 | A1 | 3/2007 |
| WO | WO2008/135222 | | 11/2008 |
| WO | 2009048938 | A1 | 4/2009 |
| WO | WO2011/127372 | | 10/2011 |
| WO | WO2013/163041 | | 10/2013 |
| WO | 2015021025 | A1 | 2/2015 |
| WO | WO2015/021025 | A1 | 2/2015 |

OTHER PUBLICATIONS

Eureka Swan, Project Swan Recycling of Mating Process Water; executive Summary of Eureka Swan Project AR0916—Reduction of water use in the EU Malting Industry; pp. 1-11.

PCT International Search Report, PCT/US2013/037443, dated Sep. 5, 2013, 1 page.

PCT International Search Report, PCT/US2011/031723, dated Jun. 13, 2011, 1 page.

European Search Report of application No. 10004207.6, dated Sep. 7, 2010.

Supplemental European Search Report of application No. EP11766794, dated Dec. 19, 2013.

Katagiri et al. "Effect of the Composition of Steep Liquor Upon Barley Malting", Bulletin of the Institute for Chemical Research, Kyoto University, (1953), 31 (3): 232-233.

Extended European Search Report of Application No. 14834728 dated Mar. 6, 2017 (3 pages).

"Wheat quality and the 'Falling Number' test", Penn State Extension, Jul. 16, 2013, pp. 1-2, XP002767313.

Dewar, J., et al., "Determination of Improved Steeping Conditions for Sorghum Malting", Journal of Cereal Science 26 (1997) 129-136.

Finney, K. F., "An optimized straight-dough, bread-making method after 44 years", Cereal Chemistry, V. 61, 1984, pp. 20-27.

Kruger, J. E., "Enzymes of sprouted wheat and their possible technological significance", Wheat : production, properties and quality : Sym; Blackie (1994), 143-153., Std. No. 9780751401813.

Owuama, C. I., et al., "Studies on malting conditions for sorghum", Food Chemistry 49 (1994) 257-260.

Ratnavathi, C. V., et al., "Effect of Different Durations of Steeping and Malting on the Production of Alpha-amylase in Sorghum", Journal of Cereal Science 14 (1991) 287-296.

"European Application Serial No. 14834728.9, Notice of Opposition dated Jun. 22, 2020", 17 pgs.

"European Application Serial No. 14834728.9, Response filed Nov. 17, 2020 to Notice of Opposition dated Jun. 22, 2020", 20 pgs.

"Sprouted White Spring Whole Wheat Flour", Ardent Mills, 2014, 4 pgs.

Charoenthaikij, Phantipha, et al., "Germination Conditions Affect Physicochemical Properties of Germinated Brown Rice Flour", Journal of Food Science vol. 74, Nr. 9, (2009), C658-C665.

Ehmke, Laura C., "Impact of controlled sprouting of wheat kernels on bread baking performance", (2017), 82 pgs.

Kunze, "", Technology Brewing and Malting, (Jun. 2019), 947 pgs.

Kunze, et al., "Chapters 2.5.2.5-2.5.3.1", Technology Brewing and Malting, 150-151.

Marti, Alessandra, et al., "Flour from sprouted wheat as a new ingredient in bread-making", LWT—Food Science and Technology 89, (2018), 237-243.

Narziss, "", Die Bierbrauerei: Band 1—Die Technologie der Malzbereitung (German Edition), (2012), 480 pgs.

Narziss, "Die Bierbrauerei: Band 1—Die Technologie der Malzbereitung (with English machine translation)", Wiley-VCH, (2012), 354-359; 537-549; 576-577; 592-603.

Watanabe, Michiyo, et al., "Application of Pregerminated Brown Rice for Breadmaking", Cereal Chem. vol. 81, No. 4, (2004), 450-455.

\* cited by examiner

PROCESSES FOR MAKING STEEPED WHOLE GRAINS AND PRODUCTS COMPRISING STEEPED WHOLE GRAINS

CROSS-REFERENCE TO RELATED APPLICATIONS

This application is a national phase application of international application PCT/US2014/049739, filed Aug. 5, 2014, which application claims the benefit of the U.S. Provisional Application Ser. No. 61/863,369, filed Aug. 7, 2013, entitled PROCESSES FOR MAKING SPROUTED GRAINS AND PRODUCTS COMPRISING SPROUTED GRAINS, which is hereby incorporated by reference in its entirety.

TECHNICAL FIELD

The present disclosure relates to novel processes for producing sprouted whole grains and products comprising the sprouted whole grains made by these processes. Various embodiments according to the disclosure comprise steps of steeping at least one grain for a period of time to a desired moisture content, optionally germinating the at least one grain, and kilning the at least one grain to produce a sprouted grain. In further embodiments of the disclosure, the sprouted whole grains may be used in whole wheat and refined flour. Yet further embodiments relate to products comprising the sprouted whole grains, such as dough products, baked goods, brewing applications, and non-alcoholic grain based beverages.

BACKGROUND

Wheat and other grains, such as barley and sorghum, may be used for the production of beverages, such as beer. For example, in the production of certain malted beverages, a barley seed is subjected to a malting process, which increases enzymatic activity. The enzymes, such as amylases, beta-glucanases and xylanases, degrade the starch and non-starchy components from the seeds. Thereafter, the malt may be used in processes such as brewing, milling or other fermentation processes.

For example, in traditional malting processes for production of beer, water and barley seeds may be added to a steep tank. The seeds soak up the water in the steep tank, where the temperature of the water ranges from about 3° C. to about 21° C. thereby increasing the seed moisture content. The presence of water and oxygen then triggers the growth of the plant embryo. Traditionally, seeds are steeped to a moisture content ranging from about 35% to about 45%, such as about 38% to about 45%. In a typical example of a traditional method seeds are steeped in water for about 12 hours, aerated for about 8 hours, and then steeped again in water for about an additional 6 hours. The seeds may be steeped for a period of time ranging from about 20 hours to about 40 hours. Traditionally, about 100% of the seeds are chitted after the steeping process.

After the steeping step, the seeds are germinated in a germination step. During germination, biochemical reactions occur within the kernels leading to the activation of enzymes, the breakdown of cell walls and proteins, and an increase in the bioavailability of nutrients. The seed kernels "grow" over a period of about three to about four days during the germination step. The grain may also be gently turned to sustain even growth and to prevent the kernels from matting together. For example, the grain may be turned about every 8 to 10 hours. By the end of the germination step, rootlets have formed on the kernels, and the moisture content of the seeds ranges from about 40% to about 47%, such as about 44 to about 47%, wherein the seeds may be sprayed with water as necessary during the germination step to maintain the desired moisture content. Applied humidified air may be circulated to maintain a temperature ranging from about 7° C. to about 29° C. in the malt bed, depending on the malting location and season of year. The germinated seeds, known as green malt, traditionally will have an α-amylase activity ranging from as low as about 10 dextrinizing units (DU), for example in Munich malt, to as great as about 130 DU, for example in distiller's malt.

After the germination step, the germinated seeds are then put in a kiln for drying. Kilning circulates warm air to dry the seeds, helps develop flavor and color in the seeds, and arrests the biochemical reactions taking place in the seeds. After kilning, brittle rootlets break off and may be easily removed. Traditionally, the kiln removes moisture from the seed until the moisture content of the seed ranges from about 4% to about 6%, and the seeds are kilned for about 24 hours at a low temperature, such as a temperature ranging from about 49° C. to about 85° C. or as high as about 93° C. After kilning, the resulting malt will also have an α-amylase activity ranging from about 10 DU to about 130 DU. To the naked eye, the malt looks similar to the original kernel. However, inside the kernel, changes have taken place, and the malt is now ready to be stored or sent to a brewery or mill for further processing.

Grains may also be used in the production of flour, such as for baked goods. For example, wheat is traditionally cleaned and then tempered for several hours, such as about 18 to about 24 hours, to soften and increase the moisture content of the wheat kernels. Thereafter, the kernels are passed through a milling or grinding process to produce flour, and the wheat grains are no longer considered "whole kernel," and if the flour is fractionated into germ, bran and endosperm, the wheat flour no longer fits the definition of "whole grain."

It is also possible, however, to use malted grains wherein the grains are considered "whole" in the production of flour. The malting process for grains in the production of flour is substantially identical to the process described above, for beverage production. In flour and food products produced using flour, however, whole grains are desirable for their improved nutritional benefits. To be considered a whole grain food, the food product should contain at least 8 grams of whole grain per 30 grams of product, according to American Association of Cereal Chemists recommendations. Currently, traditional whole grain flours and products made from these flours may have decreased palatability as the whole grain concentration increases. However, consumers desire products, such as baked goods, that are prepared from whole grain flours in order to achieve the nutritional benefits thereof, yet maintain a desirable taste. As such, there is a need to produce whole grains and whole grain food products with desirable taste and nutritional benefits.

Sprouting has been reported to increase key nutrients of whole grain, including antioxidants, tocopherols, thiamin (B1), riboflavin (B2), pantothenic acid (B5), biotin (B7), folic acid (B9), and fiber. Sprouting of whole grains may also reduce anti-nutrients, such as phytic acid. Phytic acid binds with important minerals such as calcium, magnesium, iron, and zinc and prevents these minerals from being absorbed in the intestine. Phytic acid also chelates niacin making it unavailable for the body. Thus, sprouted whole grains can fill the need to produce whole grains and whole grain food products with desirable taste and nutritional benefits.

SUMMARY

Disclosed herein are novel processes for producing malted grains (also referred to as "sprouted whole grains"). Also disclosed is flour produced from sprouted whole grains prepared according to embodiments of the disclosure, as well as products comprising sprouted whole grains prepared according to embodiments of the disclosure, such as dough products, baked goods, and beverages.

In certain embodiments, sprouted whole grains prepared according to embodiments of the disclosure and products comprising the sprouted whole grains may be more palatable than traditional sprouted grains and sprouted grain products, e.g. they may have a less astringent taste than traditional sprouted grains. Accordingly, baked goods and beverages made from sprouted whole grains prepared according to the processes disclosed herein may, in at least certain embodiments, require less sugar.

Both the foregoing general summary and the following detailed description are exemplary only and are not restrictive of the disclosure.

DESCRIPTION OF EXEMPLARY EMBODIMENTS

Disclosed herein are processes for producing sprouted whole grains, and products comprising the sprouted whole grains prepared according to said processes. In various embodiments, processes for producing sprouted whole grains comprise steeping at least one grain at a desired temperature for a period of time to achieve a desired moisture content, optionally germinating the at least one grain, and kilning the at least one grain to produce a sprouted grain.

Although not required, sprouted whole grains made according to at least certain embodiments of the disclosure and products comprising the sprouted whole grains may have more desirable taste and/or increased nutritional benefits compared to whole grains and products comprising these whole grains that are not produced according to the disclosure. As used herein, the phrase "sprouted whole grains" refers to grains containing substantially all of the original bran, germ, and endosperm, and wherein nutrient values have not substantially diminished. In certain embodiments of sprouted whole grains, the sprout (known as the acrospire) growth is not greater than the kernel length.

According to various embodiments of the disclosure, the seeds first undergo a steeping process. As used herein, the term "steeping" refers to wetting the seeds at a given temperature and for a given period of time to yield seeds of a desired moisture content. According to at least certain embodiments, the steeping takes place in an aqueous solution comprising, consisting of, or consisting essentially of water. In addition to water, any component typically used in a steeping process may be added to or present in the aqueous solution. By way of non-limiting example only, gibberellic acid may also be added in the steeping step to hasten metabolic activity.

As used herein the term "moisture content" refers to a proportion of dry weight over hydrated weight. Moisture content may be measured by any method known in the art. By way of example only, an oven, such as a convection, conduction or infrared oven, may be used to determine moisture content. In at least certain exemplary embodiments, a sample may be retrieved and weighed, and placed in the oven. In yet further exemplary embodiments, the sample may be dried, for example with a towel, to remove surface moisture before weighing and/or placing the sample in the oven. Further, the sample may be re-weighed after heating and weight loss calculated to determine moisture loss and moisture content of the sample.

The steeping process may, according to various exemplary embodiments, comprise one or more periods of time where the seeds are exposed to the aqueous solution (referred to interchangeably as "wetting period" or "immersion period"). When more than one wetting period is chosen, it may be desirable to have a period of time between wetting periods where the seeds are optionally aerated.

The wetting period may comprise a step of exposing the seeds to the aqueous solution by any method known. For example, the step may comprise one or more periods of immersing the seeds in the aqueous solution and/or spraying the aqueous solution onto the seeds.

Aeration of the seeds may also be achieved by any method known, such as the use of fans or compressors, for example. During aeration, the $CO_2$ produced by the respiring grains may be removed by pulling or pushing the $CO_2$, for example with fans or compressors, and thereby allowing for increased oxygen uptake.

The steeping process is performed to produce seeds having a moisture content ranging from about 29% to about 38%. In various embodiments, the steeping process produces seeds having a moisture content ranging, for example, from about 30% to about 38%, about 31% to about 38%, about 32% to about 38%, or about 33% to about 38%, about 34% to about 38%, about 35% to about 38%, about 36% to about 38%, 29% to about 37%, about 30% to about 37%, about 31% to about 37%, about 32% to about 37%, about 33% to about 37%, about 34% to about 37%, about 35% to about 37%, about 36% to about 37%, about 29% to about 34%, about 30% to about 34%, about 31% to about 34%, about 32% to about 34%, about 33% to about 34%, about 29% to about 33%, about 29% to about 32%, about 29% to about 32%, about 29% to about 31%, about 29%, about 30%, about 31%, about 32%, about 33%, about 34%, about 35%, about 36%, about 37%, or about 38%.

According to various embodiments, the steeping process may occur over period of time ranging up to about 24 hours, such as about 2 hours to about 24 hours. By way of non-limiting example, the steeping process may occur for a period of time ranging from about 4 hours to about 23 hours, such as about 4 hours to about 22 hours, about 4 hours to about 21 hours, about 4 hours to about 20 hours, about 4 hours to about 19 hours, about 4 hours to about 18 hours, about 4 hours to about 17 hours, about 4 hours to about 16 hours, about 4 hours to about 15 hours, about 4 hours to about 14 hours, about 4 hours to about 13 hours, about 4 hours to about 12 hours, about 4 hours to about 11 hours, about 4 hours to about 10 hours, about 4 hours to about 9 hours, about 4 hours to about 8 hours, about 4 hours to about 7 hours, about 4 hours to about 6 hours, about 4 hours to about 5 hours, about 6 hours to about 16 hours, about 6 hours to about 15 hours, about 6 hours to about 14 hours, about 6 hours to about 12 hours, about 6 hours to about 11 hours, about 6 hours to about 10 hours, about 6 hours to about 9 hours, about 6 hours to about 8 hours, about 7 hours. As one skilled in the art would recognize, the steeping time is dependent on the temperature of the aqueous solution, which may depend upon such factors as the facility and ambient conditions such as temperature and humidity. For example, in certain embodiments, the warmer the aqueous solution, the shorter the steeping time, e.g. for the first immersion period. For example, in certain embodiments, the colder the aqueous solution, the longer the steeping time, e.g., for the first immersion period.

According to various exemplary embodiments, the steeping process may comprise a step of wetting the seeds with the aqueous solution for a period of time, optionally followed by a period of aerating the seeds, optionally followed by another step of wetting the seeds with the aqueous solution, and so on. As such, additional aeration and wetting steps may be performed, if desired. By way of non-limiting example only, a first immersion period may range up to about 11 hours, such as about 8 hours to about 10 hours; a first aeration period may range up to about 7 hours, such as about 5 to about 7 hours; and a second immersion period may range up to about 5 hours, such as about 2 to about 4 hours.

In certain embodiments, the steeping process (wetting and/or aeration) may occur at a temperature ranging from about 2° C. to about 29° C., such as about 4° C. to about 27° C., about 7° C. to about 24° C., about 7° C. to about 21° C., about 7° C. to about 18° C., about 7° C. to about 16° C., about 7° C. to about 13° C., about 10° C./50° F. to about 18° C., about 10° C. to about 17° C., about 10° C. to about 16° C., about 10° C. to about 15° C., about 10° C. to about 14° C., about 10° C. to about 13° C., about 10° C. to about 12° C., about 10° C. to about 11° C., about 11° C. to about 18° C., about 12° C. to about 18° C., about 13° C. to about 18° C., about 14° C. to about 18° C., about 15° C. to about 18° C., about 16° C. to about 18° C., about 17° C. to about 18° C., about 13° C. to about 16° C., about 14° C. to about 16° C., about 13° C. to about 15° C., about 13° C. to about 14° C., about 11° C., about 12° C., about 13° C., about 14° C., about 15° C., or about 16° C. In certain embodiments, the temperature of the aqueous solution may remain relatively constant for a first and a second or subsequent wetting and/or aeration period, although it is not required. It is recognized that the aqueous solution exiting an immersion may be warmer than when the immersion began, as the grains respire. Therefore, any method known for controlling the temperature during wetting and/or aeration may be chosen. For example, additional aqueous solution may be added to the steeping vessel to avoid over-heating the grain and to maintain an ideal temperature of the aqueous solution. In various embodiments, the aeration temperature may be higher or lower than the immersion temperature.

In certain exemplary embodiments, after the steeping process about 50% to about 100% of the seeds are chitted, such as about 50% to about 75% or about 75% to about 100% of the seeds. As used herein, the term "chitted" refers to the first sign of germination from a kernel, as may be visually observed by the acrospire. One skilled in the art will recognize that different seed varieties have different chitting rates, and therefore the percentage of seeds chitted may depend upon the variety of seed used. By way of non-limiting example only, a steeping process for producing hard white sprouted wheat according to embodiments of the disclosure may yield about 20% to about 50%, such as about 25% to about 40%, such as about 30%, chitted seeds.

According to at least certain embodiments of the disclosure, compared to traditional malting processes, the germination period is significantly reduced, and in some cases substantially eliminated or eliminated altogether. For example, according to certain embodiments, after steeping the seeds remain at about 29% to about 38% moisture, such as about 34% to about 37% moisture, and undergo a kilning process less than about 2 days after the steeping process is completed. By way of non-limiting example only, according to certain embodiments disclosed herein, the germination period may last for less than about 24 hours, less than about 12 hours, or less than about 6 hours. In at least certain exemplary embodiments, the germination period may last for less than about 4 hours, less than about 2 hours, or less than about 1 hour. In at least one exemplary embodiment, the germination period is about 0 hours, i.e., the germination step is essentially eliminated from the process, and the seeds go directly from the steeping process to the kilning process. In other words, the steeped seeds are transferred from the steep vessel to the kiln vessel for kilning. By way of non-limiting example only, according to certain embodiments disclosed herein, the time of transfer is not more than 10 hours, such as about 2 hours to about 8 hours, about 2 hours to about 7 hours, about 2 hours to about 6 hours, about 2 hours to about 5 hours, about 2 hours to about 4 hours, about 2 hours to about 3 hours, about 3 hours to about 8 hours, about 4 hours to about 8 hours, about 5 hours to about 8 hours, about 6 hours to about 8 hours, about 7 hours to about 8 hours, about 2 hours, about 3 hours, about 4 hours, about 5 hours, about 6 hours, about 7 hours, about 8 hours, about 9 hours, or about 10 hours.

According to certain embodiments, after a germination period of less than about 2 days, the seeds having a moisture content ranging from about 29% to about 38% undergo a kilning process. The kilning process involves heating the seeds for a period of time and at a temperature to produce seeds having a specified moisture content and α-amylase activity. During the kilning process, it may be desirable to control air circulation. By use of the phrase "controlled air circulation" and variations thereof, it is meant recirculation of the heated and humidified air. In various embodiments, in controlled air circulation, up to about 100% of the air in the kilning vessel is recirculated, such as up to about 65%, to decrease the moisture content of the seeds after steeping (which is from about 29% to about 38% moisture content) to about 7% to about 16% moisture content after kilning. In various embodiments, from about 65% to about 100% of the air is recirculated, and from about 0% to about 35% of the air in the kilning vessel is exhausted. In other various embodiments, from about 75% to about 100% of the air is recirculated, and from about 0% to about 25% of the air in the kilning vessel is exhausted.

For example, one of skill in the art may optimize the convectional removal of the aqueous solution and/or the conductional removal of the aqueous solution. One skilled in the art may, for example, alter fan speeds to create drying air currents, circulation of air, and/or applied temperature to manipulate enzymes and proteases for the desired end product specification, such as moisture content and α-amylase activity. Understanding the biological function of enzymes at difference moisture contents allows for manipulating the activity of enzymes in the final product, for example, α-amylase is highly insensitive to heat at low moistures but at higher moistures is sensitive to heat and will denature and become inactive. Knowledge of kiln operation allows the controller to optimize surface moisture removal, moisture content and grain temperature to meet product specifications. For example, removing approximately 5% of the moisture, which is on the surface, but leaving the moisture in the grain and applying heat without exhausting the air would deactivate α-amylase.

The kilning process may range in time up to about 20 hours, such as from about 6 hours to about 18 hours, about 8 hours to about 16 hours, about 10 hours to about 15 hours, or about 12 hours to about 14 hours. In at least one exemplary and non-limiting embodiment, the kilning process lasts about 14 hours. Further, the kilning process may occur at temperatures ranging from about 49° C. to about 93° C., such as about 49° C. to about 88° C., about 50° C. to about 85° C., or about 66° C. to about 88° C.

In various embodiments, the seeds may be kilned for varying times and/or at varying temperatures. For example, the kiln temperature may be stable for a period of time, after which it is increased and then kept stable at the increased temperature for a subsequent period of time, and so on. In certain embodiments, the kiln temperature may remain relatively stable throughout the kilning process. In addition, it is not required that the temperature be kept stable at any point during the kilning process; it is possible to increase the temperature, for example gradually, throughout the process. Thus, any combination of time and temperature may be chosen for the kilning process and is done so based on the desired final product specifications, such as the desired moisture content, color, and enzyme activity.

By way of non-limiting example only, in an embodiment where four different temperatures are chosen, the seeds may be kilned at a first temperature ranging from about 60° C. to about 70° C., such as about 68° C., followed by kilning at a second temperature ranging from about 71° C. to about 77° C., such as about 71° C., followed by kilning at a third temperature ranging from about 77° C. to about 82° C., such as about 79° C., followed by kilning at a fourth temperature ranging from about 83° C. to about 93° C., such as about 85° C. The times that the kilning occurs at each temperature can range anywhere from a few minutes to a few hours.

In at least certain embodiments, the kilning process includes exposing the seeds to a high temperature shock process, which may be carried out at greater than about 77° C., such as about 77° C. to about 85° C., about 77° C. to about 79° C., or about 85° C., for example. The high temperature shock process may include a step of circulating air through the kiln, where the air is humidified at increasing amounts greater than about 60%, such as greater than about 75%, such as from about 75% to about 100%. Optionally, the high temperature shock process may occur at the beginning of the kilning process.

According to various embodiments, once the kilning process is complete, the seeds may have a final moisture content ranging from about 7% to about 16%, such as about 7% to about 15%, about 7% to about 14%, about 7% to about 13%, about 7% to about 12%, about 7% to about 11%, about 7% to about 10%, about 7% to about 9%, about 7% to about 8%, about 8% to about 16%, about 9% to about 16%, about 10% to about 16%, about 11% to about 16%, about 12% to about 16%, about 13% to about 16%, about 14% to about 16%, about 10% to about 14%, about 11% to about 14%, about 12% to about 14%, about 10% to about 13%, about 10% to about 12%, about 11% to about 12%, about 7%, about 8%, about 9%, about 10%, about 11%, about 12%, about 13%, about 14%, about 15%, or about 16%.

Germination of a seed causes accelerated production of enzymes, such as α-amylase, which is a starch degrading enzyme. Alpha-amylase acts to liquefy a starch. The rheological impact of α-amylase and other enzymes on starch may be measured by the Falling Number (FN). As used herein, FN refers to a method for measuring sprouting, typically pre-harvest, and is correlated to the α-amylase activity in the kernels. The FNs referenced herein were measured using a FN apparatus from Perten Instruments, Inc., Springfield, Ill. (FN 1900 110v, Serial Number 1473378) and the methodology provided by the American Association of Cereal Chemists (AACC) International's Method 56-81.03 for the Determination of Falling Number, which measures the time in seconds required to stir and allow the stirrer to fall a measured distance through a hot aqueous flour or meal gel undergoing liquefaction. As one skilled in the art would recognize, locations at an elevated altitude may obtain FN values higher than those determined at sea level, and appropriate adjustments may be made when the altitude is greater than 2000 feet.

Alpha-amylase activity may be associated with kernel sprouting (i.e., the degree of sprouting in a kernel of grain and alpha-amylase activity can be quantified by the FN), and both the α-amylase activity and the degree of kernel sprouting are inversely correlated with the FN. In addition, it is known that α-amylase activity in flour affects bread quality and can adversely affect the baking process. The FN can measure the α-amylase activity of flour. Flour with a low FN will produce bread with poor texture, a sticky bread crumb and will be difficult to process. Bread made from flour with a low FN can result in loaves with poor volume and a dry bread crumb. The shelf life of the bread will also be adversely affected. It is important, therefore, to use flour with the correct FN.

According to various embodiments, the processes disclosed herein allow for the production of a stable sprouted whole grain. As used herein, the term "stable" refers to the controlled activation and subsequent deactivation of enzymes, such as α-amylase and proteases, such that when the sprouted whole grain is not immediately milled and held for a period of time, such as, by way of example and without limitation, hours, days, weeks, or even months, the FN does not significantly decrease and the gluten is not negatively impacted as indicated by the Farinograph stability test method AACC 54-21.02 for flour (Brabender Farinograph-E, Brabender GmbH & Co. KG, Germany). Dough stability, which is indicative of gluten strength, is increased by about 50% using sprouted whole wheat flour compared to unsprouted whole wheat flour.

According to certain embodiments, the resultant stable sprouted whole grain may be used to make flour; dough and dough products; baked products, such as bread, pastries, muffins, tortillas, bagels, pizzas, crackers, and the like; and beverages such as beer and non-alcoholic beverages, and the like, by any method known to those of skill in the art. It is contemplated that any grain may be used in the processes described herein, such as wheat, barley, rye, oats, hulled varieties, hull-less varieties, etc. In at least one embodiment, the grain is wheat, and the wheat may be chosen from any wheat variety, including red wheat, white wheat, soft wheat, hard wheat, spring wheat, winter wheat, and the like.

By way of non-limiting example only, the processes disclosed herein allow for controlled activation and subsequent deactivation of enzymes, such as α-amylase, to produce a stable sprouted whole wheat flour with a falling number ranging from about 220 to about 280, which is ideal for baking bread. Whole wheat flour with a FN greater than 300 seconds is considered free of sprouted damage (i.e., no α-amylase present) while whole wheat flour with a FN less than 160 seconds is considered unsuitable for bread making. In addition, it is known that an increase in enzyme activity, such as α-amylase, leads to the degradation of gluten (i.e., protein) and starch, which can negatively impact baking performance. From the processes disclosed herein, α-amylase activity is controlled and, as such, sprouted whole wheat flour can be more acceptable for use by the baking industry.

In addition to impacting α-amylase activity, malting grains, such as wheat, has an effect on sugar content. For example, in certain varieties of wheat, the percentages of sugars may increase with time and temperature. For example, for malted wheat, the total sugar content may increase about 250% over the span of three days and about 500% over the span of five days. As such, the sprouted whole wheat produced according to various embodiments disclosed herein may be used in the production of products, such as baked goods, that comprise less sugar than traditional formulations, and yet maintain a palatable taste. In yet further embodiments, the sprouted whole wheat may be used in the production of goods that comprise increased nutraceuticals compared to traditional formulations.

It is also noted that, in certain embodiments, the sprouted whole wheat produced from embodiments disclosed herein may be used in the production of products, such as baked goods, that require less yeast than traditional formulations and yet maintain a sufficient rise.

As used herein, the phrases "less sugar than traditional formulations," "less yeast than traditional formulations," "increased nutraceuticals compared to traditional formulations," and variations thereof, including, for example, "reduced sugar content" and "reduced yeast content," are meant to indicate formulations that are otherwise identical or substantially identical (other than the amount of sugar and/or yeast used) to those made according to embodiments of the disclosure, except that the whole grain is not prepared according to the disclosure. According to various embodiments, the formulations may comprise up to about 60% less sugar or yeast than traditional formulations, such as up to about 50%, up to about 40%, up to about 30%, up to about 25%, up to about 20%, up to about 15%, up to about 10%, up to about 5%, or up to about 2% less sugar and/or yeast.

Additionally, higher kilning temperatures may lower the α-amylase and/or protease activity, and higher initial temperatures at the beginning of the kilning step may also lower the α-amylase and/or protease activity. If the α-amylase content is too high, resultant baked products, such as bread, may collapse.

As described herein, according to various embodiments, any of the timing, temperature, and moisture content of any step throughout the process may differ from those of traditional malting processes. One skilled in the art will recognize that times for each step in the processes disclosed herein may be dependent on the temperature of the aqueous solution and the ambient temperature at the sprouting facility.

Unless otherwise indicated, all numbers used in the specification and claims are to be understood as being modified in all instances by the term "about," whether or not so stated. It should also be understood that the precise numerical values used in the specification and claims form additional embodiments of the disclosure, as do all ranges and subranges within any specified endpoints. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

It is to be understood that both the foregoing description and the following examples are exemplary and explanatory only and are not intended to be restrictive. In addition, it will be noted that where steps are disclosed, the steps need not be performed in that order unless explicitly stated that such order is required.

The accompanying figures, which are incorporated in and constitute a part of this specification, are not intended to be restrictive, but rather illustrative of exemplary embodiments of the disclosure.

Other embodiments will be apparent to those skilled in the art from consideration of the specification and practice of the disclosure.

EXAMPLES

The following examples are not intended to be limiting of the disclosure. The wheat used in the following examples is available from Cargill, Incorporated, Wayzata, Minn. The malting processes described in Examples 1, 2, 3 and 4 were performed using a Joe White Malting Systems Micromalter unit (Joe White Maltings Pty, Limited, Perth, Australia) while Examples 5, 6, 7 and 8 were performed in a Cargill malting facility in Sheboygan, Wis.

Example 1

16 kg of Snowcrest Hard Spring White Wheat samples were malted. The kernels were steeped in water at 13° C. for 10 hours, followed by 6 hours of aeration, 4 hours of additional steeping, and then 4 hours of additional aeration for a total of 24 hours steeping time. The moisture content of the kernels following steeping was 36%. The kernels did not undergo a traditional germination step, but rather were transferred to a kiln for 4 hours at 87° C. (100% recirculation), followed by 8 hours at 71° C. (no recirculation), 2 hours at 77° C. (no recirculation), 2 hours at 85° C. (no recirculation), and 1 hour at 38° C. (no recirculation), for a total kilning time of 17 hours.

Steeping occurred for around 24 hours. After kilning, the moisture content was 8.4% and the FN was about 170 seconds, which is indicative of a high increase in α-amylase activity. Therefore, this set of process conditions did not allow for the resulting sprouted whole wheat kernel to be milled and used for baking.

Example 2

8 kg of Snowcrest Wheat Select samples (250 g/compartment) were malted. The kernels were steeped in water at 14° C. for 9 hours, followed by 6 hours of aeration, followed by a second steeping in water for 4 hours, and followed by 4 hours of aeration, for a total of 23 hours steeping time. The moisture content of the kernels following steeping was 31.6%. The kernels did not undergo a traditional germination step, but rather were transferred to a kiln for the following times and temperatures: 4 hours at 68° C. (no recirculation), followed by 2 hours at 71° C. (no recirculation), followed by 30 min at 79° C. (no recirculation), and finally followed by 1 hour at 85° C. (no recirculation), for a total kilning time of 7.5 hours.

This trial resulted in the desired amount of α-amylase activity as indicated by the FN of 250 seconds, and the moisture content was 12%. A portion of the resulting spouted whole wheat kernel was immediately milled into flour, which was used in the baking experiments. With another portion, it was held for 14 days and it was observed that the germ was still viable because of the low enthalpy kilning conditions (i.e., no recirculated air) and 12% moisture content, similar to raw wheat. Accordingly, the whole wheat kernel continued to sprout and change, including the FN which fell to 81 seconds and thus indicative of high α-amylase activity, thus deeming the kernels unstable.

Example 3

8 kg of Snowcrest Wheat Select samples (250 g/compartment) were malted. The goal was to sprout and minimize the impact on gluten and α-amylase production, with a target moisture content of greater than 10% for the finished malt. At a temperature of 14° C., the kernels were steeped for 10 hours, followed by aeration for 6 hours, followed by steeping for 4 hours, followed by aeration for 4 hours, for a total of 24 hours steeping time. The moisture content of the kernels following steeping was 36%.

The kernels did not undergo a traditional germination step, but rather were transferred to a kiln for the following times and temperatures:
Ramp 30 min to 40° C. (no recirculation, fan 50%);
Plateau at 40° C. for 1 hour (no recirculation);
Ramp 30 min to 50° C. (no recirculation, fan 50%);
Plateau at 50° C. for 1 hour (no recirculation);
Ramp 1 hour to 85° C. (no recirculation);
Plateau for 4 hours, (50% recirculation, fan 75%);
Ramp 1 hour to 75° C. (no recirculation);
Plateau for 4 hours (no recirculation, fan 75%);
Ramp 1 hour to 50° C. (no recirculation); and
Plateau for 2 hours (no recirculation), for a total kilning time of 16 hours.

Steeping occurred for 24 hours. The resultant FN was 160, and therefore indicative that too much α-amylase activity was created for the steeping temperature and length of steeping. Therefore, this set of process conditions did not allow for the resulting sprouted whole wheat kernel to be milled and used for baking.

Example 4

8 kg of Snowcrest Wheat Select samples (250 g/compartment) were malted. The kernels were steeped in water at 14° C. for 10 hours, followed by 6 hours of aeration, and 3.75 hours steeping in water, for a total of 19.75 hours steeping time. The moisture content of the kernels following steeping was 35%. The kernels did not undergo a traditional germination step, but rather were transferred to a kiln for the following times and temperatures:
Ramp 30 minutes to 50° C. (no recirculation, fan 50%);
Plateau at 50° C. for 30 minutes (no recirculation);
Ramp 1.5 hours to 85° C. (no recirculation);
Plateau for 2 hours (75% recirculation, fan 50%) (moisture tested);
Ramp to 85° C. for 1.5 hours (no recirculation), for a total kilning time of 6 hours.

This trial resulted in the desired amount of α-amylase activity as indicated by the FN of 250 seconds, and a moisture content of 11%, after kilning. The processing conditions destroyed the germ viability while minimizing the impact to the gluten, which resulted in a stable sprouted whole wheat kernel product.

Example 5

102,058.3 kg of Snowcrest Wheat Select kernels were malted. The kernels were steeped in water at 18° C. for 6 hours and the moisture content of the kernels following steeping was 37%. The kernels did not undergo a traditional germination step, but rather were transferred over a period of 5 hours to a kiln for the following times and temperatures:
Ramp 30 minutes to 50° C. (no recirculation, fan 50%);
Plateau at 50° C. for 45 minutes (no recirculation);
Ramp 1.5 hours to 85° C. (no recirculation);
Plateau for 2 hours (75% recirculation, fan 50%) (moisture tested), for a total kilning time of 4.75 hours.

This trial resulted in a FN of 290 seconds. The moisture content was 14.5% when the kiln cycle ended, and further evaporation during transfer of the kernels to storage silos and transportation to the mill for milling lowered the moisture content during transfer to 8%.

Example 6

102,058.3 kg of Snowcrest Wheat Select samples were malted. The kernels were steeped in water at 17° C. for 6 hours and the moisture content of the kernels following steeping was 35%. The kernels did not undergo a traditional germination step, but rather were transferred over a period of 7 hours to a kiln for the following times and temperatures:
Ramp 30 minutes to 50° C. (no recirculation, fan 50%);
Plateau at 50° C./122° F. for 45 minutes (no recirculation);
Ramp 1.5 hours to 85° C. (no recirculation);
Plateau for 2.5 hours (75% recirculation, fan 50%) (moisture tested), for a total kilning time of 5.25 hours.

This trial resulted in a FN of 215 seconds, and the moisture content was 8.8%.

Example 7

52,160 kg of Snowcrest Wheat Select samples were malted. The kernels were steeped in water at 9° C. for 16 hours and the moisture content of the kernels following steeping was 35%. The kernels did not undergo a traditional germination step, but rather were transferred over a period of 5 hours to a kiln for the following times and temperatures:
Ramp 24 minutes to 50° C. (no recirculation, fan 30%);
Plateau at 50° C. for 45 minutes (no recirculation);
Ramp 1.5 hours to 85° C. (no recirculation);
Plateau until the average temperature of the air coming out of the kiln bed was 63° C./145° F., so total time was less than 1 hour (75% recirculation, fan 30%) (moisture tested), for a total kilning time around 3.65 hours.

This trial resulted in a FN of 290 seconds, and the moisture content was 14.9%. This batch was unique because of the reduced batch size than what is typically used in the facility (i.e., from 102,058.3 kg to 52,160 kg), and thus the process was modified to deal with less material and less moisture to remove.

Example 8

102,058.3 kg of Snowcrest Wheat Select samples were malted. The kernels were steeped in water at 14° C. for 12 hours and the moisture content of the kernels following steeping was 36%. The kernels did not undergo a traditional germination step, but rather were transferred over a period of 8 hours to a kiln for the following times and temperatures:

24 minutes to 50° C. (no recirculation, fan 50%);

Plateau at 50° C. for 45 minutes (no recirculation);

Ramp 1.5 hours to 85° C. (no recirculation);

Plateau for 2 hours (75% recirculation, fan 50%) (moisture tested), for a total kilning time of 4.65 hours.

This trial resulted in a FN of 260 seconds, and the moisture content was 15.5%.

Example 9

Three loaves of bread were baked using sprouted whole wheat white flour prepared according to Example 4 and containing various amounts of sugar. One loaf using the basic recipe contained full sugar. One loaf contained 25% reduced sugar, and one loaf contained 50% reduced sugar. The basic recipe was as follows:

| Sprouted Whole Wheat Bread | | | |
|---|---|---|---|
| | True % | Bakers % | Grams |
| Sprouted Whole Wheat White Flour | 53.763% | 100.00% | 1000.0 |
| Brown Sugar | 0.000% | 0.000% | 0.0 |
| Honey | 2.688% | 5.000% | 50.0 |
| Yeast | 2.688% | 5.000% | 50.0 |
| Vital Wheat Gluten | 2.688% | 5.000% | 50.0 |
| Vegetable Oil | 2.151% | 4.000% | 40.0 |
| Additive | 0.538% | 1.000% | 10.0 |
| Salt | 0.968% | 1.800% | 18.0 |
| ICS 56 | 0.108% | 0.200% | 2.0 |
| Water (variable) | 34.409% | 64.00% | 640.0 |
| Totals | 100.00% | 186.00% | 1860.0 |

A control loaf of bread was also baked using traditional (i.e., non-sprouted) white flour using the same ingredients but at different water percentage to make the control dough at the same moisture content as the sprouted whole wheat dough.

Figure 1A:
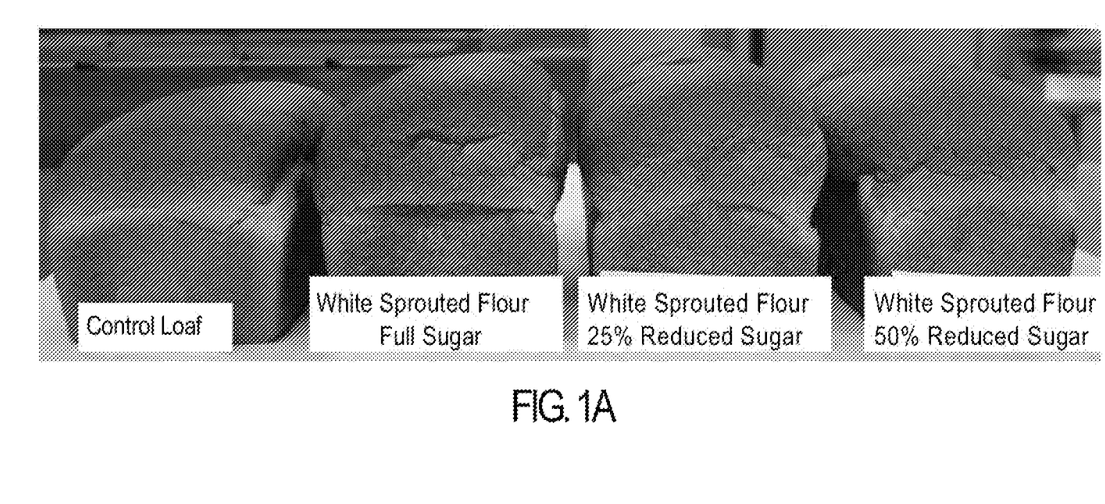
FIG. 1A is a photograph showing, from left to right, loaves of bread baked with traditional white flour, white sprouted whole wheat flour with full sugar, white sprouted whole wheat flour with 25% reduced sugar, and white sprouted whole wheat flour with about 50% reduced sugar.
Figure 1B:
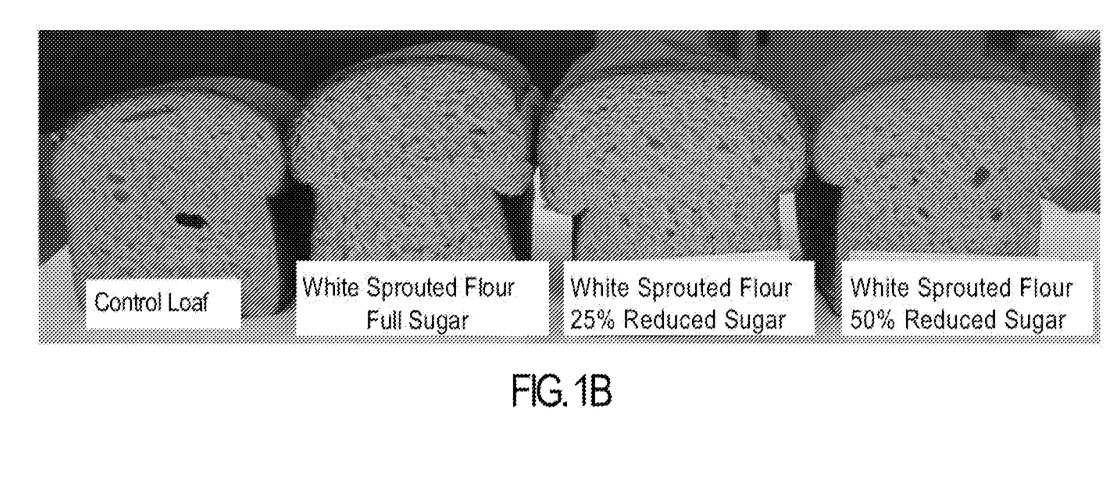
FIG. 1B is a photograph showing, from left to right, the inside of loaves of bread baked with traditional white flour, white sprouted whole wheat flour with full sugar, white sprouted whole wheat flour with 25% reduced sugar, and white sprouted whole wheat flour with about 50% reduced sugar.

FIGS. 1A and 1B are photographs of the resultant loaves, showing, from left to right, the control loaf prepared with traditional white flour; the loaf prepared with sprouted whole wheat white flour and full sugar; the loaf prepared with sprouted whole wheat white flour and 25% reduced sugar; and the loaf prepared with sprouted whole wheat white flour and 50% reduced sugar. Compared to the control loaf, the loaves made with sprouted whole wheat white flour have increased bread volume. The flour utilized for the three loaves was created very soon after the sprouted whole wheat kernel was produced by the process described in Example 2 and milled (and thus destroying the biochemical machinery to synthesize more enzymes like α-amylase). In other words, once the sprouted whole wheat kernel was milled, the flour had a stable FN and was used to make loaves, but subsequent processing of that sprouted whole wheat kernel resulted in a FN of 162 seconds, suggesting the kernel had increasing α-amylase activity.

Table 1 below notes the observations recorded for each loaf for the sponge, the dough off the mixer, and the dough during make up and after proofing. It was further observed that the color of the crust got lighter with the amount of sugar taken out, such that the loaf containing 50% reduced sugar had the lightest crust. The control and sprouted whole wheat white flour bread with full sugar were similar in color.

TABLE 1

| | Sponge | Dough off mixer | Dough during make up and after proofing |
|---|---|---|---|
| Control | Stiff sponge, slightly tacky | Firm, slightly under mixed. Sponge was smaller than sprouted white whole wheat sponges | Stretched a lot, not much strength. Needed more age or more mix. Proofed in 60 minutes. |
| White sprouted whole wheat flour; full sugar | Longer hydration, slightly sticky | Sponge had good volume. Dough was slightly undermixed; stickier than control | Firm, easy to make up, proofed in 60 minutes. |
| White sprouted whole wheat flour; 25% reduced sugar | Longer hydration, slightly sticky | Sponge had good volume. Dough was slightly undermixed; stickier than control | Firm, easy to make up, proofed in 60 minutes. Oversized; should have proofed for 55 minutes. |
| White sprouted whole wheat flour, 50% reduced sugar | Longer hydration, slightly sticky | Sponge had good volume. Dough was slightly undermixed; stickier than control | Firm, easy to make up, proofed in 60 minutes. Oversized: should proofed for 55 minutes. |

These results show that sprouted whole wheat flour having a controlled α-amylase activity can be used to make whole wheat bread that is similar in structure to traditional whole wheat bread, with the benefits described herein, including less sugar addition and less yeast. The sprouted wheat loaves may have increased palatability.

What is claimed is:

1. A process for producing a dough from a steeped grain comprising:
    steeping whole wheat grain at a temperature from about 7° C. to about 24° C. for a period of time of about 4 hours to less than 20 hours to a moisture content from about 29% to about 38%;
    transferring steeped whole wheat grain to a kiln, a time of transfer being 10 hours or less; and
    kilning with controlled air circulation the whole wheat grain at a temperature from about 49° C. to about 93° C. for a period of time of about 2 to about 8 hours to a moisture content of 9% to 16% to produce a steeped whole wheat grain;
    milling or grinding the steeped whole wheat grain to produce a flour; and
    mixing the flour with a plurality of ingredients to form a dough,
    wherein the Falling Number (FN) of the flour made from the steeped whole wheat grain is from about 200 seconds to about 300 seconds.

2. The process according to claim 1, wherein the steeping of the whole wheat grain comprises:
    a first steeping of the whole wheat grain for a period of time up to about 10 hours;
    aerating the whole wheat grain for a period of time up to about 6 hours; and
    a second steeping of the whole wheat grain for a period of time less than 4 hours.

3. The process according to claim 1, wherein the whole wheat grain is steeped to a moisture content from about 32% to about 37%.

4. The process according to claim 1, wherein the moisture content of the whole wheat grain is maintained during the transfer step from about 29% to about 38%.

5. The process according to claim 1, wherein the whole wheat grain is kilned at a temperature ranging from about 49° C. to about 88° C.

6. The process according to claim 1, wherein the step of kilning is performed with controlled air circulation up to about 100%.

7. The process according to claim 1, wherein the moisture content of the whole wheat grain after kilning is from about 11% to about 14%.

8. The dough according to claim 1, wherein the dough has at least one of a reduced added sugar content and a reduced added yeast content.

9. The process of claim 1, wherein the kilning process includes exposing the whole wheat grain to a temperature ranging from about 83° C. to about 93° C.

10. The process of claim 1, wherein the steeped whole wheat grain is stable when the steeped whole wheat grain is not milled.

11. The process of claim 1, wherein the Falling Number (FN) of a flour made from the steeped whole wheat grain is from about 220 seconds to about 280 seconds.

12. The process of claim 1, wherein the time of transfer is six hours or less.

13. The process of claim 1, wherein kilning with controlled air circulation of the whole wheat grain includes:
 ramping up to a first temperature of at least 50° C. and holding at the first temperature for a first period of time;
 ramping up to a second temperature and holding at the second temperature for a second period of time, wherein the second temperature is higher than the first temperature and the second period of time is longer than the first period of time.

14. The process of claim 13, wherein the second temperature is 85° C.

15. The process of claim 13, wherein a total period of time for kilning is six hours or less.

16. A method of making a dough for bread from steeped whole wheat kernel, the method comprising:
 steeping whole wheat grain a temperature between about 9° C. and about 20° C. for a time period of 20 hours or less;
 transferring steeped whole wheat grain directly to a kiln, a time of transfer being 10 hours or less:
 kilning the whole wheat grain in a first step by ramping up to a first temperature of at least 50° C. and holding at the first temperature for about 1 hour or less;
 kilning the whole wheat grain in a second step by ramping up to a second temperature of at least 85° C. and holding at the second temperature for about 3 hours or less to produce a steeped whole wheat grain, wherein a total kilning time is 10 hours or less;
 milling or grinding the steeped whole wheat grain to produce a flour; and
 mixing the flour with a plurality of ingredients to form a dough.

* * * * *